(No Model.)
J. SHUSTER.
BELT FASTENER.
No. 254,167. Patented Feb. 28, 1882.
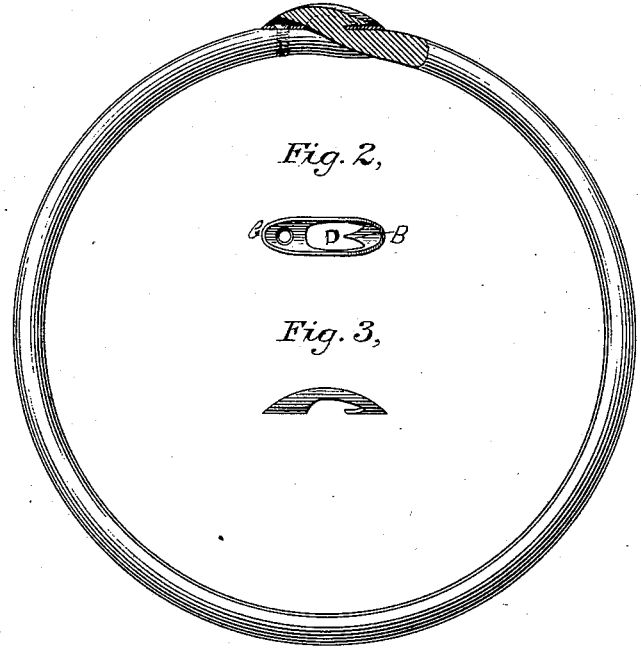
WITNESSES
INVENTOR
Jacob Shuster

UNITED STATES PATENT OFFICE.

JACOB SHUSTER, OF WASHINGTON, DISTRICT OF COLUMBIA, ASSIGNOR OF ONE-HALF TO GEORGE W. HOUSEL, OF JUNCTION, NEW JERSEY.

BELT-FASTENER.

SPECIFICATION forming part of Letters Patent No. 254,167, dated February 28, 1882.

Application filed December 1, 1881. (No model.)

*To all whom it may concern:*

Be it known that I, JACOB SHUSTER, a citizen of the United States, residing at Washington, in the District of Columbia, have invented certain new and useful Improvements in Belts; and I do hereby declare that the following is a full, clear, and exact description of the invention, that will enable others skilled in the art to which it appertains to make and use the same, reference being had to the accompanying drawings, and to the letters of reference marked thereon, which form a part of this specification, and in which—

Figure 1 is a sectional view of my improved belt-coupling as applied for use or to a belt. Fig. 2 is a plan view, and Fig. 3 is a side view, of my coupling.

In this class of couplings it is greatly desirable to effect the coupling together of the ends of the belt so as to prevent their possible accidental coming apart from strain or other cause and at the same time to permit of their ready adjustment or separation when desired to repair the belt or for other purpose; and to this end my invention consists of a plate having a pointed tooth or tongue arranged to project within an aperture or opening, up through which passes one end of the belt, its other end being riveted or otherwise fastened to the plate, as hereinafter more fully described, and specifically pointed out in the claim.

In carrying out my invention I use a plate or frame, A, formed with a pointed tooth or tongue, B, projecting into an aperture or opening, D, made in itself, through which one end of the belt is passed, intercepted and penetrated by the tooth, as clearly seen in Fig. 2, while the other end of the belt is riveted or fastened to the opposite end, C, of the plate. This construction of coupling effects the connecting together of the ends of the belt in a manner that will prevent their possible accidental coming apart from strain or other cause and at the same time permits their ready adjustment or separation by pulling upon the end caught by its tooth and forcing it past the tooth. The tooth or tongue B may, if desired, be beveled on its under side, upward toward its point, or be otherwise sharpened. I turn up the sides of the frame-plate, giving it somewhat the shape of the letter U in central cross-section, as clearly seen in Figs. 1 and 3, to avoid its wearing contact with the flange of the pulley.

It will be noticed that the underlapping end of the belt being beveled the inner surfaces of the meeting points are enabled to stand flush with and permit them to overlap, and thus strengthen each other.

Having thus fully described my invention, I claim and desire to secure by Letters Patent—

The plate A, one end of which is adapted to be rigidly attached to a belt, and having its sides turned up, imparting to the plate an approximate U shape in central cross-section, provided with the fixed pointed tongue or tooth, and an opening into which the tongue or tooth projects and one end of the belt passes, substantially as and for the purpose set forth.

JACOB SHUSTER.

Witnesses:
   W. J. FRIZZELL,
   G. W. HOUSEL.